P. FROST.
Scythe Fastening.
No. 9,531.
Patented Jan. 11, 1853.
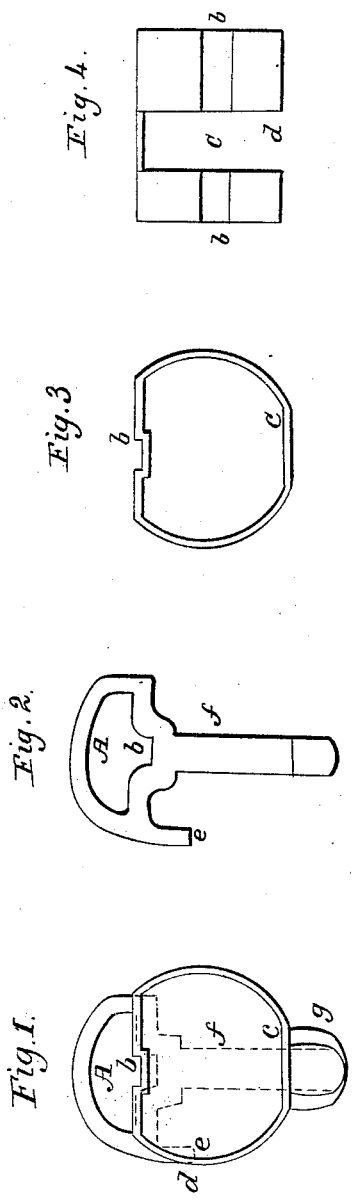
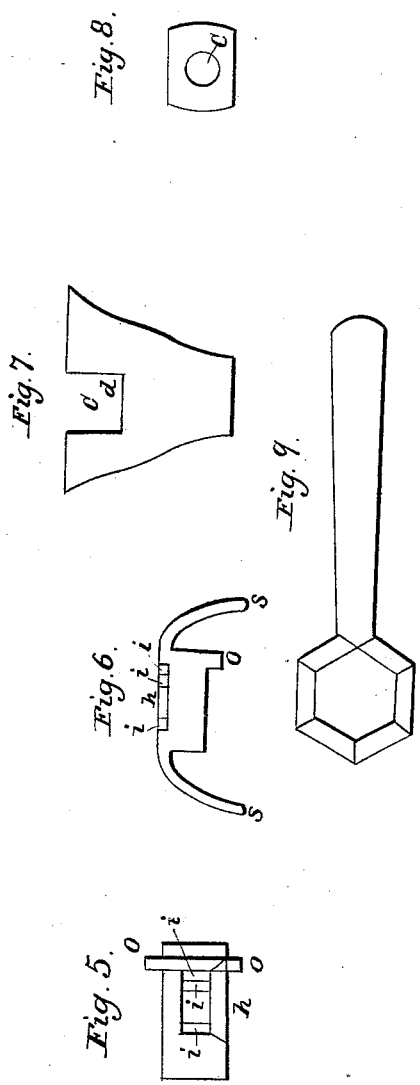

UNITED STATES PATENT OFFICE.

PINCKNEY FROST, OF SPRINGFIELD, VERMONT.

IMPROVEMENT IN SCYTHE-FASTENINGS.

Specification forming part of Letters Patent No. 9,531, dated January 11, 1853.

*To all whom it may concern:*

Be it known that I, PINCKNEY FROST, of Springfield, in the county of Windsor and State of Vermont, have invented a new and Improved Mode of Fastening Scythes to the Snath; and I do hereby declare that the following is a full and exact description thereof.

The accompanying drawings are views of the scythe-snath fastening.

The same letters refer to like parts.

Figure 1 represents the loop-bolt as used in connection with the set-ring; Fig. 2, a side view of the loop-bolt, the thickness of which can be seen in the openings in Figs. 4 and 7 at C; Fig. 3, an end view of the set-ring; Fig. 4, a view of the set-ring as seen on the spotting; Fig. 7, a view of one side of the set-ring; Fig. 8, a view of the set-ring on the side opposite the spotting.

A in Figs. 1 and 2 is the opening for the admission of the shank or arm of the scythe; $b$, the grooves for the passage of the claw.

C in Figs. 4 and 7 represents the opening in the set-ring for the admission of the loop-bolt, Fig. 2; $d$, the opening in the set-ring for the admission of the hook or lip $e$; $f$, the bolt, which passes vertically through the snath and set-ring at $c$; $g$, the nut on the end of the bolt $f$, turned by the wrench, Fig. 2, by means of which the loop is drawn down upon the shank or arm of the scythe, fastening it firmly to the spotting.

Fig. 5 is a view of the face of the socket; Fig. 6, a side view of the socket $h$—the depression on one side of the claw-hole—in which the extremity of the shank or arm of the scythe rests; $i$, the slides for the convenience of varying the point of the scythe; O O O, projections on three sides of the socket, for the purpose of gaining the greater strength of wood in attaching it to the snath; $s$, straps passing partially around the snath, and confined by screws or a rivet to the wood.

The nature of my invention consists, first, in the peculiar construction of the set-ring, which has a groove for the passage of the claw of the scythe, and an opening or mortise for the admission of the loop-bolt, as shown in Figs. 4 and 7 of the drawings; second, the peculiar construction of the loop-bolt, consisting of a loop for the admission of the shank or arm of the scythe, the groove for the passage of the claw, together with the hook or lip, which fills the opening in the set-ring on the side of the snath, as shown in Fig. 7, the inside of the hook or lip bent firmly against the wood, the opposite end of the loop bearing against the set-ring.

It will be readily seen that the devices constituting this mode of fastening are constructed to suit the different sizes of shanks.

The advantages gained by the use of the grooves are, first, to admit the arm and claw of the scythe to pass through the loop without making it so large as to be inconvenient and unnecessarily heavy; second, they lessen the labor in fastening the scythe to and unfastening it from the snath, it being unnecessary to turn the nut as far as would otherwise be required. Another advantage of this method of fastening is, the draft by the screw being toward the spotting, the scythe will be held more firmly than if it were sidewise or lengthwise.

What I claim as my invention, and desire to secure by Letters Patent, is—

The peculiar construction of the loop and the set-ring with the grooves $b$, in the manner and for the purpose set forth.

PINCKNEY FROST.

Witnesses:
SAML. W. PORTER,
CHARLES C. CHURCH.